(12) United States Patent
Mukherjee et al.

(10) Patent No.: US 12,360,833 B2
(45) Date of Patent: Jul. 15, 2025

(54) NIC BASED COLLECTIVE ACCELERATION

(71) Applicant: Enfabrica Corporation, Mountain View, CA (US)

(72) Inventors: Shrijeet Mukherjee, Mountain View, CA (US); Thomas Norrie, Mountain View, CA (US); Shimon Muller, Mountain View, CA (US)

(73) Assignee: Enfabrica Corporation, Mountain View, CA (US)

( * ) Notice: Subject to any disclaimer, the term of this patent is extended or adjusted under 35 U.S.C. 154(b) by 0 days.

(21) Appl. No.: 18/903,851

(22) Filed: Oct. 1, 2024

(65) Prior Publication Data

US 2025/0110815 A1 Apr. 3, 2025

Related U.S. Application Data

(60) Provisional application No. 63/587,410, filed on Oct. 2, 2023.

(51) Int. Cl.
*G06F 9/54* (2006.01)
(52) U.S. Cl.
CPC .................. *G06F 9/546* (2013.01)
(58) Field of Classification Search
None
See application file for complete search history.

(56) References Cited

U.S. PATENT DOCUMENTS

| | | | |
|---|---|---|---|
| 7,831,745 B1 * | 11/2010 | Eiriksson | G06F 13/28 710/22 |
| 8,332,460 B2 | 12/2012 | Blocksome et al. | |
| 10,908,841 B2 | 2/2021 | Lakshman et al. | |
| 2008/0301683 A1 * | 12/2008 | Archer | G06F 9/4843 718/102 |
| 2014/0358869 A1 * | 12/2014 | Kim | G06F 3/067 707/692 |
| 2020/0195708 A1 * | 6/2020 | Danjo | G06N 3/08 |

(Continued)

OTHER PUBLICATIONS

Klenk et al. "An In-Network Architecture for Accelerating Shared-Memory Multiprocessor Collectives" 2020 ACM/IEEE(ISCA) pp. 1-14.*

(Continued)

*Primary Examiner* — Charles E Anya
(74) *Attorney, Agent, or Firm* — Goodwin Procter LLP

(57) ABSTRACT

A system and method for producing and transmitting reduced data is disclosed. In some embodiments, the system comprises an ACF and reduction processors. The reduction processors are configured to perform a data reduction process. The ACF is configured to obtain access to input data from multiple flows, the input data identified by SGLEs included in input SGLs, and move a portion of the input data from each flow of the multiple flows to a respective reduction processor of the multiple reduction processors, such that each reduction processor receives a respective portion of the input data from each flow. The ACF is further configured to obtain access to reduced data produced from the input data using the data reduction process performed by the multiple reduction processors and move the reduced data to one or more destinations, where the reduced data identified by an output SGL.

21 Claims, 6 Drawing Sheets

(56) References Cited

U.S. PATENT DOCUMENTS

2022/0217085 A1\* 7/2022 Sankar ............... H04L 69/18
2023/0239351 A1\* 7/2023 Mukherjee ......... H04L 69/22
                                                    709/224

OTHER PUBLICATIONS

Liu et al. "An In-Network Architecture for Accelerating Shared-Memory Multiprocessor Collectives" Oct. 2021 IEEE pp. 1-13.\*
International Search Report and Written Opinion for International Patent Application No. PCT/US2024/49424, dated Jan. 15, 2025 (14 pages).

\* cited by examiner

NIC BASED COLLECTIVE ACCELERATION

CROSS REFERENCE TO RELATED APPLICATION

This application claims the benefit of U.S. Provisional Patent Application No. 63/587,410, titled "NIC based Collective Acceleration," and filed on Oct. 2, 2023, the entire contents of which are incorporated by reference herein.

TECHNICAL FIELD

This disclosure relates to accelerating collective operations in an in-network reduction environment.

BACKGROUND

In-network reduction is a method of reducing data as it streams through network or connectivity nodes by reducing the data that needs to be transferred downstream of any node where reduction is possible. However, for complex collective operations such as all-reduce operations, traditional in-network reduction or data reduction systems and approaches may increase latency and cause networking cost and complexity to escalate, resulting in poor net performance.

SUMMARY

To address the shortcomings mentioned above, a method and system for producing and transmitting reduced data are disclosed herein. In some embodiments, the disclosed system may include an accelerated compute fabric (ACF) and multiple reduction processors. The multiple reduction processors are configured to perform a data reduction process. The ACF is configured to obtain access to input data from multiple flows, the input data identified by SGLEs included in input SGLs, and move a portion of the input data from each flow of the multiple flows to a reduction processor of the multiple reduction processors, such that each reduction processor receives a respective portion of the input data from each flow. The ACF is further configured to obtain access to reduced data produced from the input data using the data reduction process performed by the multiple reduction processors and move the reduced data to one or more destinations, where the reduced data is identified by an output SGL.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles, and features explained herein may be employed in various and numerous embodiments.

BRIEF DESCRIPTION OF THE DRAWINGS

The disclosed embodiments have advantages and features that will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

In various examples, "data reduction" can be or include a process of reducing multiple data units into a single data unit by performing a mathematical operation on the multiple data units. The mathematical operation can be or include any mathematical operation, such as, for example, addition, subtraction, multiplication, division, minimum, maximum, summation, or any combination thereof. For example, multiple data units can be received from respective data flows or sources (e.g., one data unit from each flow or source), and the multiple data units can be reduced to a single data unit by performing a mathematical operation (e.g., addition). The single data unit produced by a data reduction process can be referred to as "reduced data."

In various examples, "in-network reduction" can be or include a data reduction process performed by a plurality of nodes in a network as data traverses the network. For example, the nodes can reduce multiple data units traversing the network into a single unit. The nodes can be or include, for example, a hub, a switch, a processing node, or any combination thereof.

In various examples, "collective acceleration" can be or include a process of accelerating a set of operations involving communication among a group of processing nodes configured to perform coordinated tasks. The coordinated tasks can include, for example, distributing data from one to many compute nodes, or collecting data from many to one compute node.

In-Network Reduction

In general, in-network reduction is a process that reduces data and the number of network nodes and branches that the data traverses during transmission across a network. In some embodiments, the data may be reduced in a network through operations of network switches, that is, in-network reduction.

Figure 1:
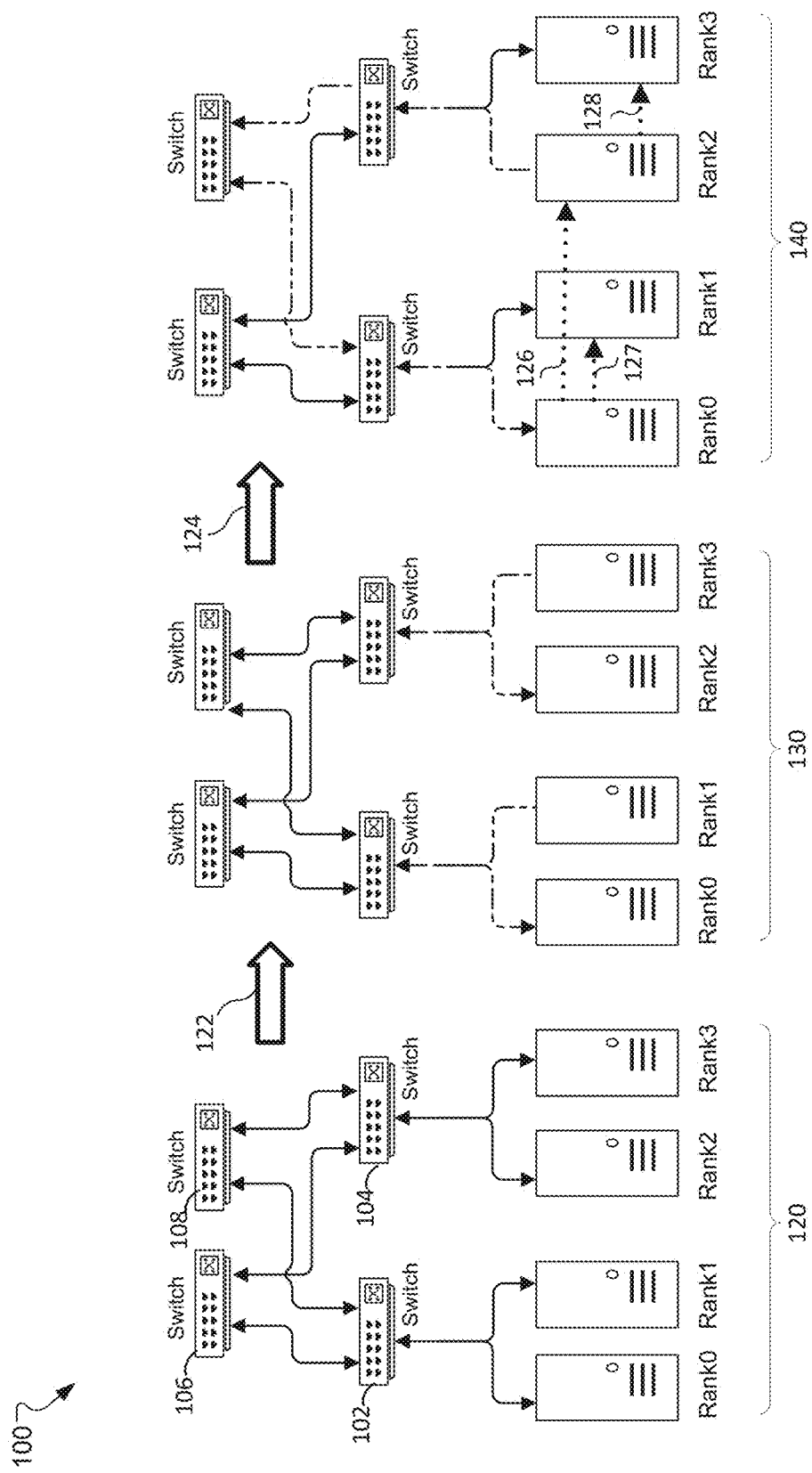
FIG. 1 illustrates an exemplary diagram of an overview data reduction process in a network, according to some embodiments.

FIG. 1 illustrates an exemplary diagram 100 of an overview data reduction process in a network. In the example of FIG. 1, a tiered network is shown, and an "all-reduce" collective operation (as described below in FIG. 2) may be performed to achieve the data reduction. The all-reduce operation includes a phased approach of iterations at each level/tier of the network. As depicted, two compute nodes are local to a first tier of switches (e.g., 102, 104). For example, switch 102 connects to local compute nodes Rank0 and Rank1, and switch 104 connects to local compute nodes Rank2 and Rank3. In a first phase of the distributed reduction, each of the local compute nodes (also referred to as a "rank") in the first tier switching will exchange the required information for the data reduction. For example, Rank1 sends information to Rank0, and Rank3 sends information to Rank2. While FIG. 1 depicts a single compute node or rank for simplicity, it should be noted that a rank (e.g., Rank 0) may include a rack of computers/compute nodes, and the collective acceleration implementation as described in this specification is not limited by the number of compute nodes/ranks. Other forms of data transformation are possible, for example, where all nodes may participate in communications simultaneously. This, however, may require a fully provisioned network and increases network load.

For a second phase of the distributed reduction, the data is also exchanged between the compute nodes using a second tier of switches (e.g., including switches 106, 108). For example, Rank0 needs to exchange information with Rank2 through switch 106 and/or switch 108, where Rank0 now includes data that has been reduced with Rank1. Similarly, Rank2 may include data that has been reduced with Rank3 through the information exchange via switches 106 and 108. At the end of this phase, Rank0 contains data that has been reduced from all four original ranks. Numerous levels/tiers of switching can be applied in practice. Since the information is exchanged between node pairs across different levels of switching, the entire process can become costly in terms of latency and CPU cycles and can reduce application scalability.

In the example of FIG. 1, the data reduction sequence is shown in the paths represented by dashed lines and dotted lines. The original network 120 includes four nodes Rank0, Rank1, Rank2, and Rank3. As indicated by arrows 122 and 124, the data reduction can be progressed from the data flow in the original network 120 to an intermediary data flow 130 and then to a final data flow 140.

In the intermediary data flow 130, Rank1 reduces into Rank0 based on the data exchange between Rank0 and Rank1, and Rank3 reduces into Rank2 based on the data exchange between Rank2 and Rank3, where the data exchange between the node pairs are shown in the dash-lined paths of 130. The data flow 130 can be further reduced to 140. In the data flow 140, Rank2 reduces into Rank0 based on data communications shown in the dash-lined paths, and Rank0 broadcasts to all Ranks (i.e., Rank1, Rank2, and Rank3) as the final reduction shown in the dot-lined paths (i.e., 126, 127, 128). In some embodiments, this reduction process can also be implemented in a tree-hierarchical topology.

To combine appropriate compute nodes and parallel branches to achieve data reduction in a network, one or more collective communication operations may be conducted. Collective communication involves more than one entity in a communication operation, aiming at reducing latency and network traffic. Collective communication operations include, but are not limited to, broadcast, synchronization, reduction, gather, scatter, scan, etc. Collective communication is frequently used in parallel programs, especially in high-performance computing (HPC) applications related to scientific simulations and data analysis (e.g., machine learning).

Figure 2:
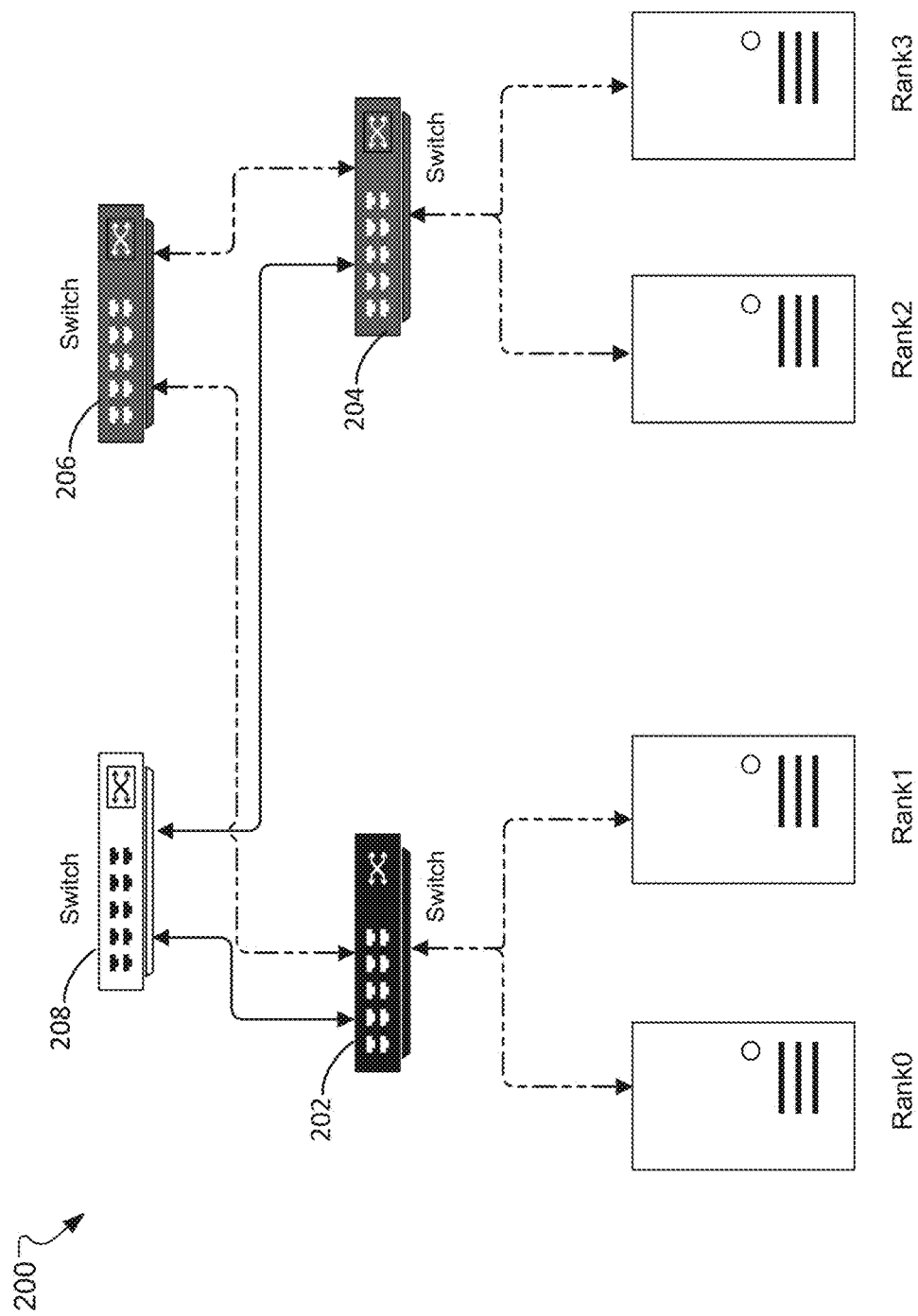
FIG. 2 illustrates an exemplary diagram of an in-network reduction configuration, according to some embodiments.

A common methodology for performing a data reduction operation is known as "all-reduce." All-reduce is a collective operation used in distributed computing to perform reductions on data (e.g., sum, max) across devices (e.g., compute nodes at a rank or across ranks) and write the results in the devices of each rank. FIG. 2 illustrates an exemplary diagram of an in-network reduction configuration 200. As discussed above, an in-network reduction can use network switches to perform data reduction operations/computations. In FIG. 2, once data (e.g., a network packet) enters network 200, aggregation units operate on the data as the data travels up to the root of the operator. An aggregation unit in network 200 may be one of the switches 202, 204, 206, and 208, which accepts data transmitted through a path from its children (e.g., reduces the data, and if appropriate, forwards the result to its parent). A child/parent unit in this example may be an aggregation unit in a lower/upper tier along a path of a current aggregation unit. An operator root can be a switch at a highest tier of a network that performs a given reduction operation, e.g., switch 206 in network 200. For example, switch 204 may receive packets from compute nodes Rank2 and Rank3, perform reduce operation(s), and transmit the reduced or aggregation result (e.g., in one or more packets) to its parent switch 206. When the data arrives at the root of network 200 (e.g., switch 206) from all downstream reduced ranks, the root switch 206 performs the final reduction and then may distribute the reduced/aggregation result to all ranks in the network.

As discussed above, when a network is capable of in-network reduction, typically implemented in switches, certain operations (e.g., all-reduce) of network reduction will be conducted. Example operations are shown below:

1. A logical topology and tag may be defined per operator. An operator (e.g., a mathematics operator) may be a function applied to return a sum, a maximum, a minimum, a product, etc. An aggregation unit (e.g., switch) may perform reduction operations on received data (e.g., packets) using different operators for different tags. A tag may identify an operator or operation.
2. Each switch/aggregation unit in a path between the ranks (e.g., Rank0, Rank1) may be initialized in the logical topology with one or more tags.
3. Packets from each rank that are sent into the logical network may be tagged and transmitted in a specific data format.
4. The operator per tag may be applied to all incoming data at each switch (e.g., aggregation unit) on the path the data is being transmitted, and the resultant data may be sent up toward the root of the operator by each switch/aggregation unit.
5. When the data has reached the operator root (e.g., switch 206) of network 200, and an operation has been applied by the operator root, all the resultant data can be distributed to all the ranks that are present in network 200. An operator root is the aggregation unit that applies a final operator.

In the example of FIG. 2, Rank0 and Rank1 as well as Rank2 and Rank3 simultaneously send data to switches 202 and 204 respectively connected to these ranks or compute nodes. These switches, acting as aggregation units, may apply the operator(s) to aggregate or combine the data from each rank into a single piece of data, thereby reducing the data that transverses the network (e.g., 200). For example, switch 204 may apply an operator (e.g., summation) to calculate a sum of packet payloads distributed across Rank2 and Rank3. When a switch (e.g., switch 204) aggregates/reduces the data (e.g., packet payloads) from different compute nodes and directs the aggregation result (e.g., the sum of packet payloads) to the same operator root (e.g., switch 206), the same operator (e.g., summation) will be applied and the same tag associated with this operator will be evaluated in the packets. At the same time, however, the switch (e.g., switch 204) may also perform other data reduction operations (e.g., maximum, minimum, multiplication, etc.). In this case, a different tag associated with the different operator will be assigned to the packets at the source.

The aggregated/combined data from both switches 202 and 204 are transmitted up to switch 206. Switch 206 may be marked as the "operator root", where a final operator is applied. The operator root may then send a copy of the reduced data to each of Ranks 0-3. With in-network reduction, the data from each source (e.g., rank, compute node) is injected into the network only once, and the volume of data is reduced as it goes toward the root of the tree or operator root. This is in contrast to algorithms where data traverses the network multiple times between network endpoints (e.g., ranks, switches).

Technical Challenges with In-Network Reduction Operation

In-network reduction implies using the switches in a connection hierarchy to perform mathematical operations (e.g., summation, multiplication, maximum, minimum) on data as the data flows through the network. In implementations such as NVIDIA® scalable hierarchical aggregation and reduction protocol (SHArP), this means that multiple incoming flows carry the tags that identify an operation and a destination port towards the root. At the intermediate switches, the operation identified by the tags can be applied to all the packets destined for the same destination port, and only the final result is sent to the destination port. At the operator root switch, the final reduction is performed and the rduced data is broadcast by the switch to all sources (ranks).

The existing architectures or designs (e.g., using SHArP) have some attributes as described below, and improvement in data reduction structure and operations related to these attributes may be desirable.

In current designs, a network-wide synchronization operation for tag assignments is needed, and any previous uses of a given tag have to be flushed. This means that all old tags are deleted. Additionally, since tags are generally used to indicate network-wide commutative operation, they are required in the current designs to allow any aggregation unit (e.g., node, switch) to compute and store partial reductions somewhere in the hierarchy.

Since there is no guarantee of the arrival time of packets from different flows, a total amount of ((N−1)×Bandwidth-Delay-Product) bytes may need to be buffered (in theory) at a switch, where N is the number of flows that traverse it.

In existing in-network reduction architectures, any network reordering or packet drops could cause the whole operation to be nullified. To perform a reduction operation, each packet has to be transformed from a generic byte stream to a specific format (e.g., mathematical operand format) to minimize the data parsing needed in the mathematical operators.

Streaming reductions using the existing architectures may lead to non-reproducible results when using floating point numerics. In streaming reductions, the order of operations may be based on a runtime packet arrival order. When non-associative floating point operations are used, the results may become non-reproducible as they can change with different operand orderings as a result of packets from various flows arriving in a different order.

As discussed above, collective communication operations are frequently used in HPC and AI applications (e.g., machine learning), and a reduction operation is one of the most commonly used collective operations. Therefore, improvements in data reduction structure and operations related to the above attributes are desirable.

All-Reduce Acceleration

Figure 3:
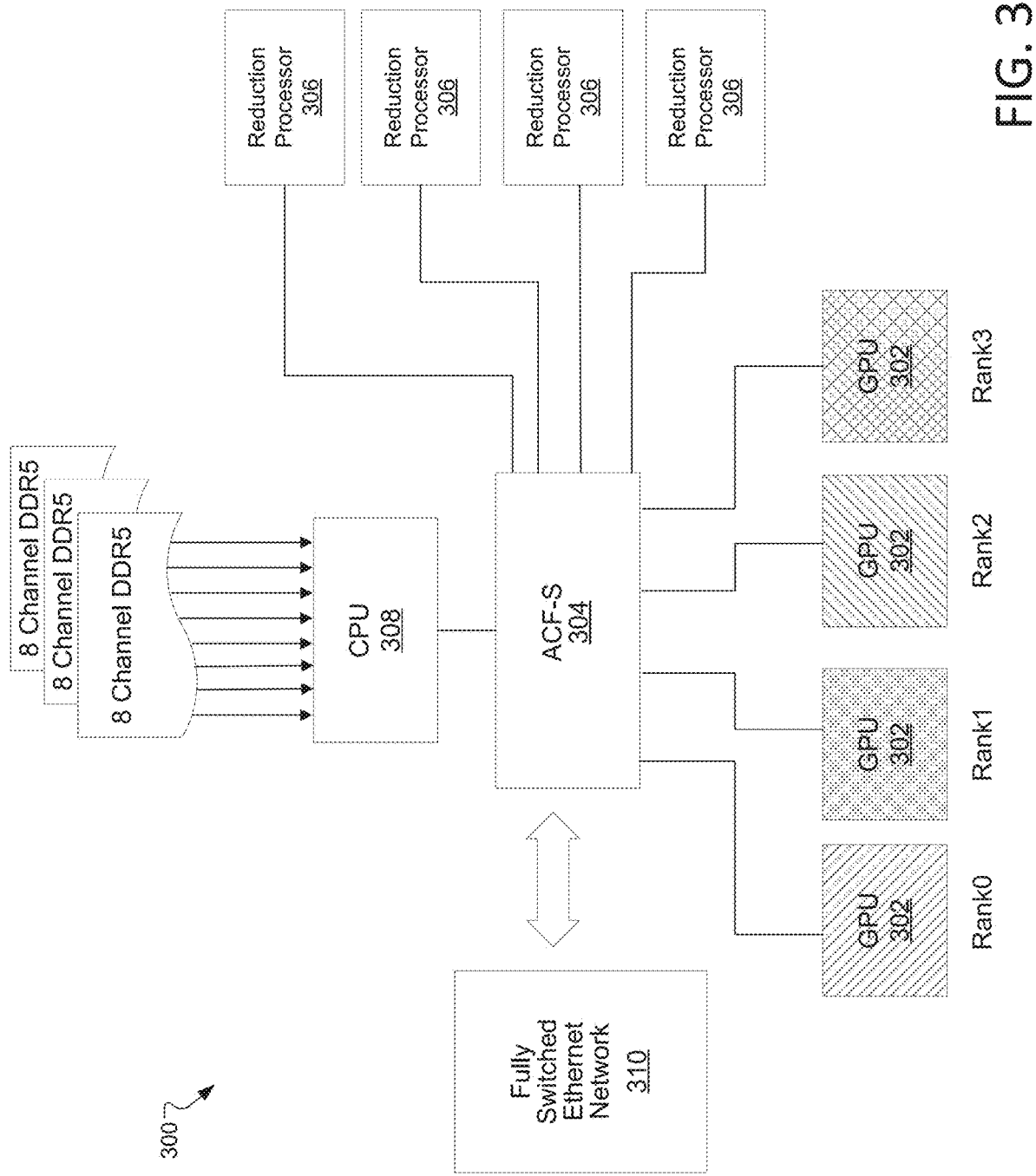
FIG. 3 illustrates an exemplary design of an accelerated compute fabric (ACF) system, according to some embodiments.

FIG. 3 illustrates an exemplary design of an accelerated compute fabric (ACF) system 300. As depicted, an ACF device or ACF 304 is communicatively connected to multiple graphic processing units (GPUs) 302, reduction processors 306, host CPU(s) 308, etc. In FIG. 3 and the below FIGS. 4-5, GPUs 302 are depicted as exemplary compute nodes or ranks involved in collective acceleration operations. Other compute nodes/ranks can be used in the collective acceleration system and approaches described herein.

ACF 304 and other components in system 300 may constitute or form a combined network interface controller (NIC) and a network switch. Input data (e.g., from a network or compute nodes) may be forwarded via ACF 304 to reduction processors 306 to have the data reduction operations (e.g., all-reduction) performed within the boundary of the system 300. ACF 304 has access to memories associated with both compute nodes (e.g., GPUs 302) and reduction processors 306, and thus can perform data flow control (e.g., postpone a fast flow piled up in a memory buffer). Additionally, ACF may move the input data to N reduction processors in parallel such that all (not one) of the reduction processors can perform the data reduction, which accelerates the data movement and reduction processing. The advantages of the present NIC-based collective acceleration are further described below.

ACF 304 is a scalable and disaggregated I/O hub, which may deliver multiple terabits-per-second of high-speed server I/O and network throughput across a composable and accelerated compute system. In some embodiments, ACF 304 may enable uniform, performant, and elastic scale-up and scale-out of heterogeneous resources. ACF 304 may also provide an open, high-performance, and standard-based interconnect (e.g., 800/400 GbE, peripheral component interconnect express (PCIe) Gen 5/6, compute express link (CXL)). ACF 304 may further allow I/O transport and upper layer protocol processing under full control of an externally controlling transport processor. In many scenarios, ACF 304 may use the native networking stack of a transport.

In some embodiments, ACF 304 may connect to one or more of the controlling hosts and endpoints, and may contain network ports for network connectivity (e.g., Ethernet ports). An endpoint may be a GPU, accelerator, field programmable gate array (FPGA), a storage or memory element (e.g., solid-state drive (SSD)), etc. ACF 304 may communicate with other portions of a data center network via the network ports.

Each of GPUs 302 may be in its own rank or node. As depicted, each of Rank0 through Rank3 respectively corresponds to one of four GPUs. The total interface (e.g., PCIe interface, CXL interface) bandwidth attached to the GPUs 302 is matched to the total bandwidth available via reduction processors 306. For example, the total bandwidth of PCIe links between ACF 304 and all the GPUs 302 can be equal to the bandwidth that ACF 304 obtains on PCIe links to the reduction processors 306. In some embodiments, ACF 304 has access to memory associated with each of the GPUs 302 (e.g., externally-attached memory, typically high-bandwidth memory (HBM)). ACF 304 can also have access to memory associated with each of the reduction processors 306 (e.g., external memory attached to the reduction processor 306), and a portion of this memory may be buffer memory that is dedicated to reduction processing. ACF 304 can access memories associated with or attached to both GPUs 302 and reduction processors 306 to move or reference data between them as needed.

Figure 4:
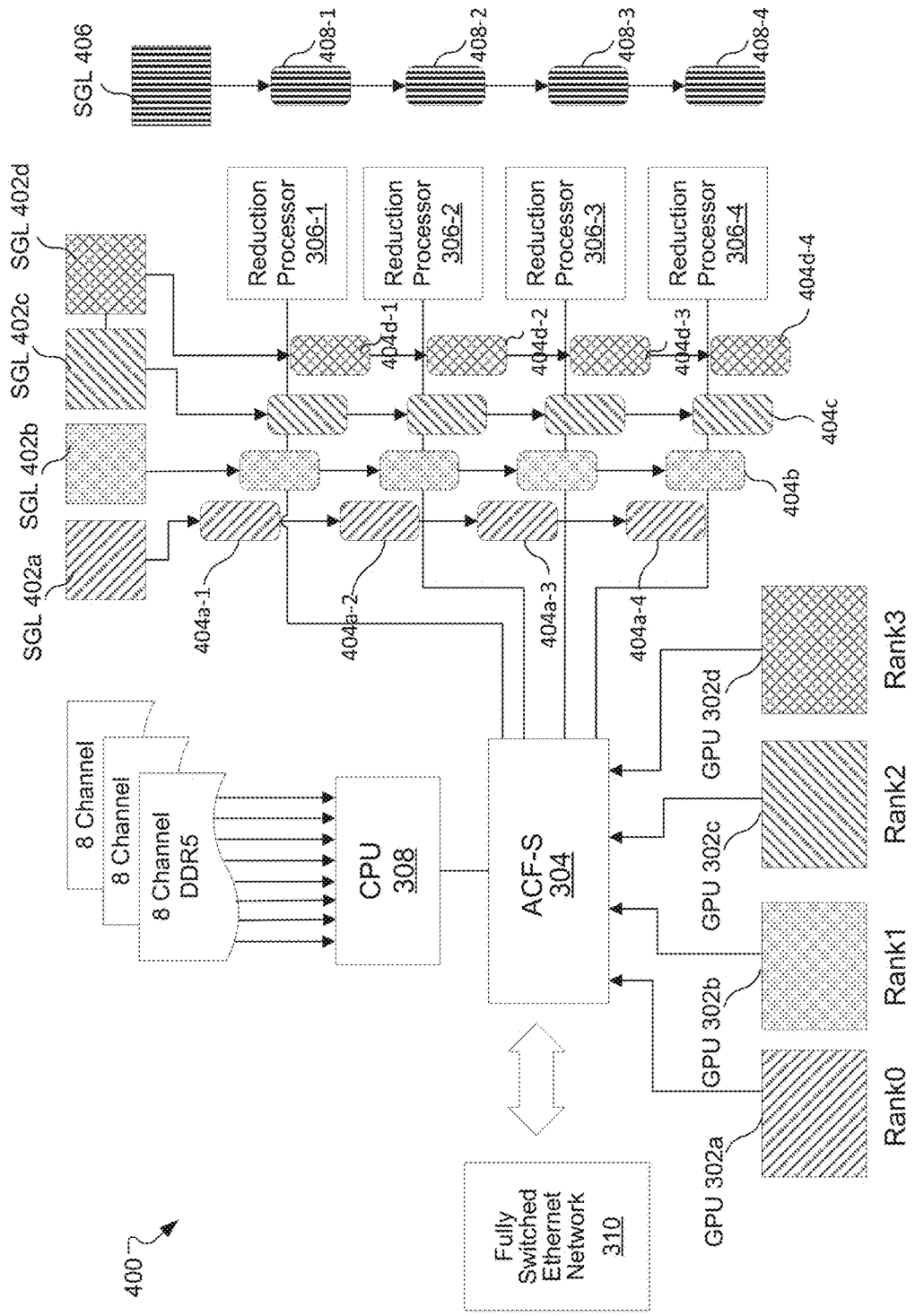
FIG. 4 illustrates an exemplary diagram for a processing flow of graphic processing units (GPU's) sending traffic to the network, according to some embodiments.

FIG. 4 illustrates an exemplary diagram of a system 400 for processing traffic sent from GPUs 302 (e.g., sending traffic) through the ACF 304 to the network (e.g., Ethernet network 310). In some embodiments, all reduction processor memories in the system 400 are managed by a collective communication library (CCL) implementation. An application programming interface (API) of the CCL implementation can indicate data sources (e.g., input ranks/compute nodes) and data destination(s) (e.g., output ranks/compute nodes). The reduction processors 306 may receive input data from the input ranks (e.g., ranks 0-3 or GPUs 302) and perform all-reduce operations to output the reduced data. For example, as described below, data from each of the input ranks (e.g., ranks 0-3 or GPUs 302) may be transmitted in parallel to memory buffers of all the reduction processors 306, such that each memory buffer receives data from each of the input ranks. In some examples, data from each rank can be divided into portions, with each portion being transmitted to a respective memory buffer of a reduction processor 306 (e.g., using the ACF 304). Each memory buffer can receive a different portion of data from a given rank. The reduction processors 306 may then reduce the data in the memory buffers as described below.

Each of the four input ranks in this example can have its own SGL data structure (e.g., SGLs 402*a*, 402*b*, 402*c*, and 402*d* or collectively SGL 402) that allows data blocks from each of the four input ranks to be moved to each reduction processor 306 for data reduction. That is, data identified by the SGL elements (SGLEs) of SGL 402 can be moved to each of reduction processors. For example, data idenfied by SGLEs 404*a*-1, 404*a*-2, 404*a*-3, and 404*a*-4 of SGL data structure 402*a* can be moved or transmitted (e.g., by ACF 304) to reduction processors 306-1, 306-2, 306-3, and 306-4, respectively. The four reduction processors 306-1, 306-2, 306-3, and 306-4 can reduce the data associated with the four SGLs 402*a*, 402*b*, 402*c*, and 402*d* to produce data associated with one output SGL (e.g., 406). The data associated with the output SGL (e.g., 406) is then transmitted to one or more destination ranks (e.g., output ranks 10-13, not shown).

To perform the data reduction process, the following steps may be performed:
1. A scatter gather list (SGL) (e.g., 402) along with four equal-sized SGL entries (SGLEs) (e.g., 404) can be created (e.g., using a host CPU 308). While four SGLEs are used for illustration in this example, in practice any number of SGLEs may be used, for example, as long as the use of SGLEs does not overwhelm an input bandwidth of the reduction processor.
2. For each SGLE, an incrementing memory region identifier (MRid) can be used.
3. ACF 304 may then deliver the input data pointed to by individual SGLEs to each reduction processor 306 by submitting all the SGLs of the same rank.
4. Some or all the reduction processors 306 can be activated.
5. Each reduction processor 306 can send completion queue entries to the CCL implementation.

In the example of FIG. 4, compute nodes or Ranks 0-3 (e.g., GPUs 302*a*, 302*b*, 302*c*, and 302*d* or collectively GPUs 302) can be sources that send out data (e.g., packets). ACF 304 may move the data from ranks 302 to reduction processors 306-1, 306-2, 306-3, and 306-4 (collectively reduction processors 306), such that the reduction processors 306 can perform the data reduction operations. In some embodiments, the present system may allow ACF 304 to utilize the SGL data structure (e.g., SGLs 402*a*, 402*b*, 402*c*, 402*d* or collectively SGL 402) to facilitate the data movement between the ranks 302 and the reduction processors 306.

Referring again to step 1 above, SGLs can be created such that each rank 302 (e.g., including one or more compute nodes) has its own SGL data structure that allows the rank 302 to move data blocks to each reduction processor. An SGL data structure can include a list of SGLEs. Each SGLE can include a pointer (e.g., a memory address) to a memory buffer and can identify a size of the memory buffer. For example, Rank0 (e.g., GPU 302*a*) may include SGL 402*a*, and the SGL 402*a* may have SGLEs of 404*a*-1, 404*a*-2, 404*a*-3, and 404*a*-4 (collectively referred to as SGLEs 404*a*). The SGLEs 404*a* point to four memory buffers attached to GPU 302*a* that contain data of GPU 302*a* (e.g., represented by a downward diagonal pattern). Similarly, each of SGLs 402*b*, 402*c*, and 402*d* may include SGLEs that point to memory buffers (e.g., four buffers) attached to each of GPUs 302*b*, 302*c*, and 302*d*, respectively, and each of these memory buffer contains the data from each of GPUs 302*b*, 302*c*, and 302*d*. For example, SGL 402*d* may have SGLEs 404*d*-1, 404*d*-2, 404*d*-3, and 404*d*-4 that point to memory buffers containing data from GPU 302*d*.

ACF 304 moves the data from GPUs 302 to reduction processors 306. Each reduction processor 306 has a block (e.g., a portion) of data from each of GPUs 302 (e.g., depicted in different patterns). The final result of the data reduction is shown in SGL 406, which includes SGLEs 408-1, 408-2, 408-3, and 408-4 pointing to reduced data stored in the memory buffers associated with the reduction processors 306-1, 306-2, 306-3, and 306-4, respectively.

Referring again to the above step 2, a memory region identifier (MRid) can be used for moving the data identified by each SGLE. In some embodiments, an MRid may identify the memory regions of GPUs 302's memory buffers pointed by SGLEs 404*a*-1, 404*a*-2, 404*a*-3, and 404*a*-4. In some embodiments, each memory region identified by an MRid may be mapped to memory that resides in or is attached to a respective reduction processor (e.g., 306-1, 306-2, 306-3, or 306-4), for example, over a PCIe interface or a CXL interface. Based on this mapping, ACF 304 can concurrently move data pointed by the SGLEs to different reduction processors 306. For example, in step 3, above, ACF 304 may move four blocks of data (e.g., pointed by SGLEs 404*a*-1, 404*a*-2, 404*a*-3, and 404*a*-4) that belong to the same flow or rank (e.g., GPU 302*a*) in parallel to memory buffers of all four reduction processors 306-1, 306-2, 306-3, and 306-4. In some embodiments, the same flow is from a same source, where the source may be one or more ranks in FIG. 4. As a result, ACF 304 delivers the data pointed by individual SGLEs to each reduction processor 306.

One or more of steps 1-5, above, may be performed using the ACF 304 with or without assistance with host CPUs 308.

For example, a host CPU 308 may allow input data to reside in a memory buffer of a memory attached to a compute node/rank, configure an SGLE to point to this memory buffer, and bundle the SGLEs in an SGL (e.g., 402*a*). ACF 304 can move the data that is pointed to by the SGLEs from the ranks 302 to the reduction processors 306. For example, consecutive blocks of data in an SGL can be forwarded by ACF 304 to consecutive MRids, thus creating a parallelization effect. The MRids can be incremented accordingly.

In step 4, above, the data concurrently transmitted to all the reduction processors 306 can trigger the processors 306 to perform a data reduction process. The data reduction process may include an all-reduce collective operation, which can be implemented based on operations such as, for example, summation, maximum, minimum, multiplication, etc., as discussed above in FIGS. 1 and 2. Each reduction processor 306 receives a portion of the input data of the same rank or flow, and thus performs a partial data reduction on the received partial data.

Once the data reduction is completed, each of the reduction processors 306 stores the final reduction result (e.g., partial end result) in a buffer in the reduction processor's memory. For example, the reduced data from reduction processors 306-1, 306-2, 306-3, and 306-4 can be pointed to by SGLEs 408-1, 408-2, 408-3, and 408-4, respectively, which form the output SGL 406. In step 5, above, the reduction processors 306 may notify the CCL implementation (e.g., via a completion queue) that the data reduction is complete and can provide the CCL implementation with the SGLEs 408-1, 408-2, 408-3, and 408-4 indicating where the resultant data is stored.

Upon receiving completion entries from all reduction processors 306, the CCL implementation can generate packets for output ranks/compute nodes (e.g., ranks 10-13), where each packet includes the output data identified by SGL 406 as payload. Since the data from input ranks 0-3 are reduced to the data included in the memory buffers pointed to by SGLEs 408-1, 408-2, 408-3, and 408-4 (e.g., the output SGL 406), the CCL implementation includes the output data identified by SGL 406 as the payloads of the packets. The CCL implementation can send the packets over the network to the destination (e.g., remote ranks 10-13, not shown in the figures).

Figure 5:
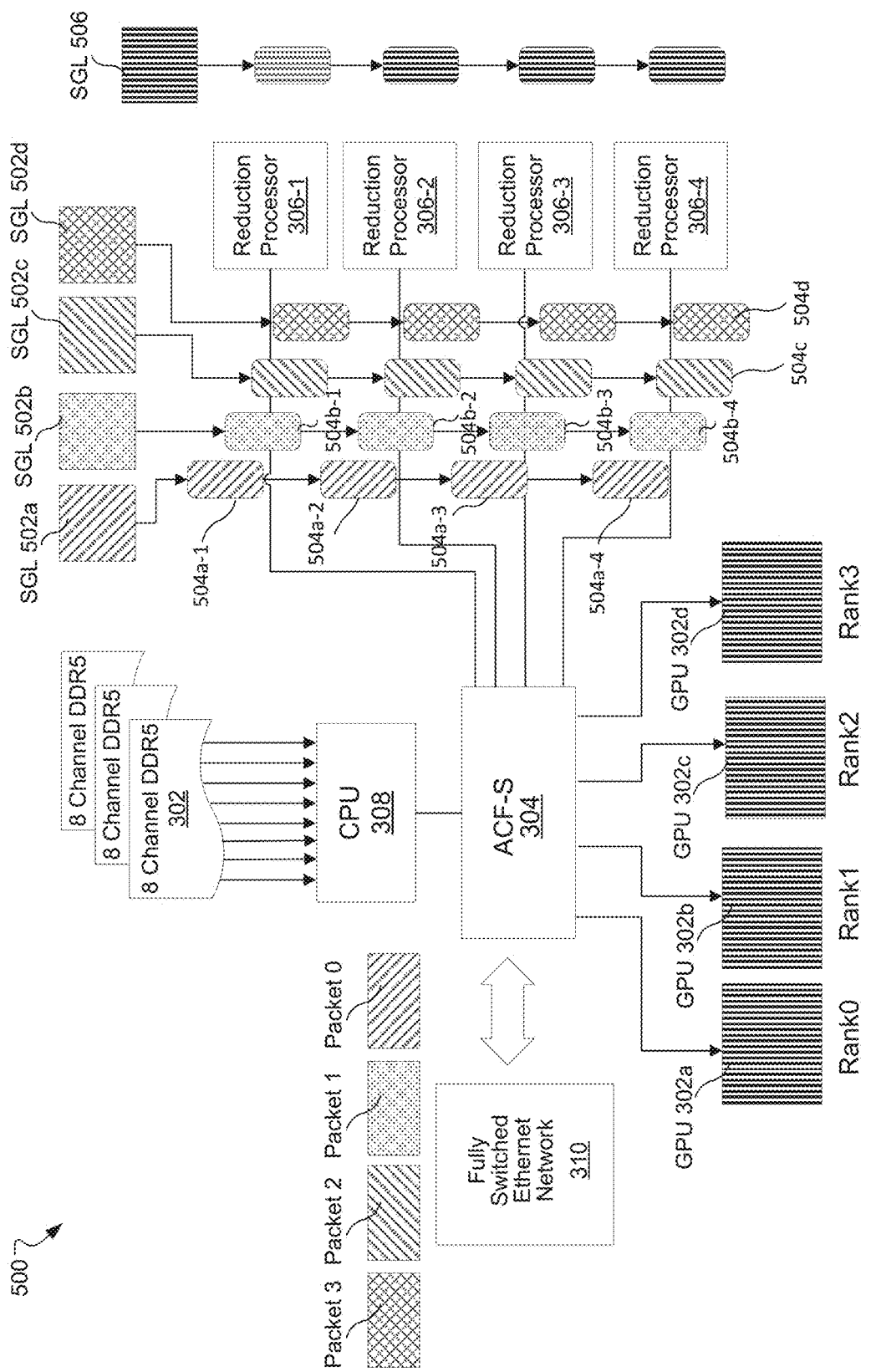
FIG. 5 illustrates an exemplary diagram for a processing flow of GPUs receiving traffic, according to some embodiments.

FIG. 5 illustrates an exemplary diagram of a system 500 for processing traffic received from a network. The received traffic can include network packets (e.g., packets 0-3) sent to GPUs 302 and/or other destination ranks through ACF 304. That is, the resultant reduction can be directed to the GPUs 302 and/or other compute nodes that are connected via the network (not shown in FIG. 5).

In some embodiments, the processing of the receiving traffic can be a standalone implementation that operates on flows as a bump in the wire. Packets in the flows can carry payloads that have operand data for reduction operations.

At network ingress, ACF 304 may identify the flows that are part of a reduction group and classify each flow into a submission queue. The reduction group may include one or more flows of data to be reduced by the reduction processors 306. In some embodiments, ACF 304 may determine a reduction group based on packet headers and/or tags that identify an operator (e.g., a mathematical operation to be performed on data). A submission queue can be or include a collection of SGLs (e.g., including SGLs 502*a*, 502*b*, 502*c*, and/or 502*b*) arranged in a circular queue. In some embodiments, the host CPU 308 may pre-post free (empty) memory buffers associated with each of the reduction processors 306 and create SGLs (e.g., 502*a*, 502*b*, 502*c*, and/or 502*d*) that contain SGLE elements pointing to respective memories (free buffers) associated with each of the reduction processors 306.

When packets (e.g., packets 0-3) arrive from the network (e.g., Ethernet network 310), ACF 304 may classify the packets (e.g., into reduction groups) and map the packet payloads to a respective submission queue that uses one or more of the SGLs 502. ACF 304 may map multiple flows (e.g., data from multiple sources) to the same submission queue. In some embodiments, ACF 304 may break the payload of a packet (e.g., in a given flow) into pieces and store the pieces (e.g., portions of the packet payload) in memory buffers pointed to by an SGLE in an SGL (e.g., 502*a*, corresponding to the given flow). In this way, ACF 304 can stripe or distribute a packet's payload across multiple reduction processors. Similarly, ACF 304 may store pieces of data from a different packet (e.g., from another flow) in memory buffers pointed to by another SGL (e.g., 502*b*, corresponding to the flow). The same process can be repeated for other packets received from the network.

Using packets 0-3 arrived from Ethernet network 310 as an example, ACF 304 may determine that packets 0 and 1 are from different flows. The payload in each of packets 0 and 1 may be separated into four portions, one for each of the four reduction processors 306. ACF 304 may store the four portions of packet 0 in respective memory buffers identified by SGLEs 504*a*-1, 504*a*-2, 504*a*-3, and 504*a*-4 of SGL 502*a*, associated with reduction processors 306-1, 306-2, 306-3, and 306-4, respectively. Likewise, ACF 304 may store four portions of packet 1 in respective memory buffers identified by SGLEs 504*b*-1, 504*b*-2, 504*b*-3, and 504*b*-4 of SGL 502*b*, associated with reduction processors 306-1, 306-2, 306-3, and 306-4, respectively. If ACF 304 determines that multiple packets among packets 0-3 are from the same flow and/or a same reduction operation will be applied to the packets (e.g., based on the tags associated with the packets), then pieces from the multiple packets may be stored in memory buffers (e.g., in or attached to the reduction processors) identified by the same SGL.

Once a predetermined number of packets from different flows have been striped or distributed across the reduction processors' memories, the reduction process can be activated. Some or all the reduction processors 306 may perform data reduction operations on the data stored in their respective memory buffers. Similar to the above discussion for FIG. 4, the reduction processors may store the reduction results (e.g., reduced data) in memory buffers pointed to by SGLEs in SGL 506 (e.g., a single output SGL). The reduction result can be forwarded to one or more destinations. For example, the reduction result can be forwarded to local ranks (e.g., GPUs 302) directly via the ACF 304, or to remote ranks (not shown) via ACF 304 and the Ethernet network 310 (bump-in-the-wire).

The design and operations as shown in FIGS. 3-5 are advantageous in various aspects. For example, to address the risk of unconstrained buffering before a reduction processor, the submission queue already pre-posts buffers with a stripe pattern. That is, the above-mentioned free memory buffers can be pre-allocated before any data traffic arrives from the network, and these buffers can be pre-allocated in a way that optimizes balanced buffering of packets across processors. To minimize buffer buildup, the implementation herein can trigger the reduction processors 306 to process incoming buffers as soon as two or more SGLEs are queued on a particular reduction processor. In this way, reduction processing can start as soon as a few portions of the data have arrived without having to wait for additional network data from the network.

Another advantage of the systems and methods described herein is that corrupted packets or duplicate retransmits may be discarded by hardware since this can corrupt a reduction processor state. In instances when flows get unbalanced, the receiver implementation can push flow control signals to slow down faster flows and avoid creation of an unconstrained buffering requirement. In some embodiments, such signals are preferentially generated by hardware state machines to minimize buffer build-up.

A further advantage is that delivery of the reduced data (e.g., in output SGL 506) to the GPUs 302 can be accelerated to minimize jitter on the receive path. In some embodiments, a hardware-accelerated multicast memory copy can be used to make the data delivery atomic from the reduction processor's perspective.

Enabling Attributes in ACF

Some attributes of ACF (e.g., 304) may enable the implementation of the functionality as described herein. To be able to stripe the GPU buffer across an increased surface (e.g., PCIe surface), the buffers can be sliced and delivered to multiple interfaces (e.g., PCIe interfaces). Therefore the reduction processor 306 does not need N×bandwidth on input ports to perform the reduction operations, where N=4 in the example of FIGS. 3-5. Instead, N reduction processors can be used, with only a portion of the reduction traffic being sent to each processor. In other words, by using multiple interfaces (e.g., PCIe interfaces associated with multiple reduction processors) to move the data that belong to the same flow, the present system can speed up the data movement by a factor of N. Therefore, data from a single flow may not need to be buffered, unlike existing systems where data is buffered because a single processor interface is too slow to accept the data.

In various examples, the ACF has visibility into buffer readiness and can delay pulling data into the striped pattern until all the buffers in collective input ranks are ready on the transmit side. Therefore, if the reduction processors (e.g., 306) start falling behind and their memory buffers fill up when conducting data reduction processing, ACF can slow down the movement of the data from the data sources (e.g., GPUs 302 or the network) to the reduction processors. This unique capability is not achievable with previous systems that utilize network switches for data reduction. On the receiving side, an implementation can also slow faster flows down using various network flow control techniques to constrain the buffering requirements.

In certain implementations, because the ACF can separate packet headers from the payloads, any operations (e.g., all-reduce) that require output to be written to multiple destinations can be achieved using the same memory buffers that hold the output from the reduction processors. For example, the reduced data can be placed in memory buffers with an SGL/SGLE 506 data structure by the reduction processors, and the same data structure can be used to send the same data in multiple network packet's transmissions. For each transmission a different packet header is used that is generated by the CPU 308. Therefore, when forwarding the resultant data to multiple destinations, the ACF may need to enqueue this structure to several transmit engines (not shown) with only trivial processing overhead.

Flowchart

Figure 6:
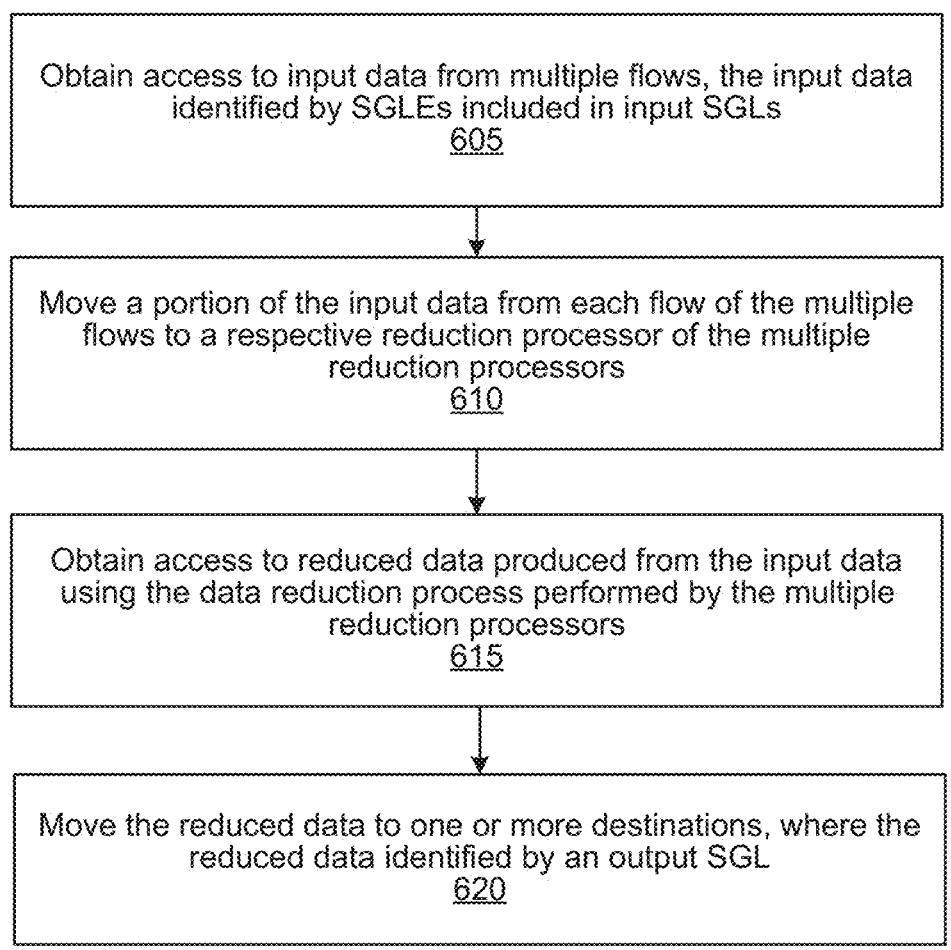
FIG. 6 illustrates an exemplary flowchart for performing collective acceleration in an in-network reduction environment, according to some embodiments.

FIG. 6 is a flowchart of a method 600 of performing collective acceleration in an in-network reduction environment, in accordance with certain examples. In some embodiments, process 600 may be implemented by an accelerated compute fabric (ACF) system (e.g., system 300 in FIG. 3). The ACF system may include an ACF device (e.g., ACF 304) that is communicatively connected to multiple ranks/compute nodes (e.g., GPUs 302), multiple reduction processors (e.g., reduction processors 306), host CPU(s), etc.

Process 600 includes obtaining, by the ACF, access to input data from multiple flows in step 605. The input data may be identified by SGLEs included in input SGLs. The input data may be sending traffic from multiple ranks/compute nodes through the ACF to a network. The input data may also be received traffic from the network through the ACF to one or more destinations (e.g., multiple ranks as shown in FIGS. 3-5).

In step 610, the ACF is configured to move a portion of the input data from each flow of the multiple flows to a respective reduction processor of the multiple reduction processors, such that each reduction processor receives a respective portion of the input data from each flow. For example, the ACF may concurrently move the input data that belongs to the same flow to each of the multiple reduction processors. In some embodiments, the ACF may identify a memory region of each memory buffer pointed to by an SGLE using an MRid and map each memory region identified by the MRid to memory buffers associated with the multiple reduction processors over multiple interfaces (e.g., PCIe interfaces, CXL interfaces). The concurrent data movement to the multiple reduction processors is based on this mapping.

In step 615, the ACF is further configured to obtain access to reduced data produced from the input data using the data reduction process performed by the multiple reduction processors. The multiple reduction processors receive the input data from the ACF and perform a data reduction process on the input data to produce an output SGL that identifies the reduced data. In some embodiments, the data reduction process includes an all-reduce collective operation. The reduction processors may start the data reduction process once receiving a few portions of the input data without waiting for the arrival of all the input data.

In step 620, the ACF is configured to move the reduced data to one or more destinations. In some embodiments, moving the reduced data includes generating and transmitting at least one packet to the one or more destinations over the network. The at least one packet includes the data identified by the output SGL as payload. In some other embodiments, moving the reduced data includes copying the data to a local rank's memory.

Additional Considerations

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer-readable medium. Storage device may be implemented in a distributed way over a network, for example as a server farm or a set of widely distributed servers, or may be implemented in a single computing device.

Although an example processing system has been described, embodiments of the subject matter, functional operations, and processes described in this specification can be implemented in other types of digital electronic circuitry, in tangibly-embodied computer software or firmware, in computer hardware, including the structures disclosed in this specification and their structural equivalents, or combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application-specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other units suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory, or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship between client and server arises by virtue of computer programs running on the respective computers and having a client-server relationship with each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

The phraseology and terminology used herein are for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system for producing and transmitting reduced data, the system comprising:
   a plurality of reduction processors configured to perform a data reduction process; and
   an accelerated compute fabric (ACF) configured to:
      obtain access to input data from a plurality of flows associated with a plurality of compute nodes, the input data identified by a plurality of scatter gather list (SGL) elements (SGLEs) included in a plurality of input SGLs;
      move a portion of the input data from each flow of the plurality of flows to a respective reduction processor of the plurality of reduction processors, such that each reduction processor of the plurality of reduction processors receives a respective portion of the input data from each flow;

obtain access to reduced data produced from the input data using the data reduction process performed by the plurality of reduction processors, the reduced data identified by an output SGL; and move the reduced data to one or more destinations, wherein a total bandwidth between the ACF and the plurality of compute nodes is matched to a total bandwidth between the ACF and the plurality of reduction processors.

2. The system of claim 1, wherein, to perform the data reduction process, the reduction processors are configured to perform at least one mathematical operation on multiple data units in the input data to produce a single data unit in the reduced data.

3. The system of claim 1, wherein, to move the reduced data, the ACF is further configured to:

generate at least one packet that includes the reduced data as a payload; and transmit the at least one packet to the one or more destinations.

4. The system of claim 3, wherein the ACF is configured to reduce processing overhead by including the output SGL in the payload of the at least one packet.

5. The system of claim 1, wherein the ACF achieves accelerated data movement and accelerated reduction speed by (i) parallelizing movement of the input data to the plurality of reduction processors across a plurality of interfaces and (ii) spreading data operations for the data reduction process across the plurality of reduction processors.

6. The system of claim 1, wherein, to move the portion of the input data from each flow of the plurality of flows to the respective reduction processor of the plurality of reduction processors, the ACF is further configured to:

identify a memory region of each memory buffer pointed to by an SGLE of the plurality of SGLEs using a memory region identifier (MRid); and map each memory region identified by the MRid to memory buffers associated with the plurality of reduction processors over multiple interfaces.

7. The system of claim 6, wherein the portion of the input data from each flow of the plurality of flows is moved using N different interfaces, and the data movement is accelerated by a factor of N.

8. The system of claim 1, wherein the input data is from the plurality of compute nodes, with each compute node from the plurality of compute nodes corresponding to a respective flow of the plurality of flows, and the reduced data is moved to the one or more destinations through a network.

9. The system of claim 8, wherein the input SGLs identify input data stored in memory buffers associated with the plurality of compute nodes, and the output SGL identifies reduced data stored in memory buffers associated with the plurality of reduction processors.

10. The system of claim 1, wherein the ACF achieves balanced data reduction by having the total bandwidth between the ACF and the plurality of compute nodes matched to the total bandwidth between the ACF and the plurality of reduction processors.

11. The system of claim 1, wherein the input data is derived from a plurality of packets received from a network, the reduced data is moved through the ACF to the one or more destinations, and the one or more destinations comprise one or more local compute nodes or one or more remote compute nodes.

12. The system of claim 11, wherein, to obtain access to the input data, the ACF is configured to:

receive the plurality of packets from a respective plurality of flows, each packet in the plurality of packets comprising a payload;

break up the payload of each packet into a plurality of input data portions; and store the plurality of input data portions in memory buffers identified by the plurality of SGLEs in the plurality of input SGLs.

13. The system of claim 12, wherein the ACF is further configured to map the plurality of the input data portions into a submission queue comprising the plurality of input SGLs, and wherein the plurality of SGLEs in the plurality of input SGLs point to pre-posted free memory buffers associated with the plurality of reduction processors.

14. A method for producing and transmitting reduced data, the method comprising:

obtaining, by an accelerated compute fabric (ACF), access to input data from a plurality of flows associated with a plurality of compute nodes, the input data identified by a plurality of scatter gather list (SGL) elements (SGLEs) included in a plurality of input SGLs;

moving, by the ACF, a portion of the input data from each flow of the plurality of flows to a respective reduction processor of a plurality of reduction processors, such that each reduction processor of the plurality of reduction processors receives a respective portion of the input data from each flow;

obtaining, by the ACF, access to reduced data produced from the input data using a data reduction process performed by the plurality of reduction processors, the reduced data identified by an output SGL; and moving, by the ACF, the reduced data to one or more destinations, wherein a total bandwidth between the ACF and the plurality of compute nodes is matched to a total bandwidth between the ACF and the plurality of reduction processors.

15. The method of claim 14, wherein performing the data reduction process comprises performing at least one mathematical operation on multiple data units in the input data to produce a single data unit in the reduced data.

16. The method of claim 14, wherein moving the reduced data comprises:

generating at least one packet that includes the reduced data as a payload; and transmitting the at least one packet to the one or more destinations.

17. The method of claim 16, wherein the ACF reduces processing overhead by including the output SGL in the payload of the at least one packet.

18. The method of claim 14, wherein the ACF accelerates data movement and reduction speed by (i) parallelizing movement of the input data to the plurality of reduction processors across a plurality of interfaces and (ii) spreading data operations for the data reduction process across the plurality of reduction processors.

19. The method of claim 14, wherein obtaining access to the input data comprises:

receiving the input data comprising a plurality of packets from a respective plurality of flows, each packet in the plurality of packets comprising a payload;

breaking up the payload of each packet into a plurality of input data portions; and storing the plurality of input data portions in memory buffers identified by the plurality of SGLEs in the plurality of input SGLs.

20. The method of claim 14, wherein the input data is from the plurality of compute nodes, with each compute node from the plurality of compute nodes corresponding to a respective flow of the plurality of flows, and the reduced data is moved to the one or more destinations through a network.

21. The method of claim 14, wherein the input data is derived from a plurality of packets received from a network, the reduced data is moved through the ACF to the one or more destinations, and the one or more destinations comprise one or more local compute nodes or one or more remote compute nodes.

\* \* \* \* \*